United States Patent
Itou et al.

(10) Patent No.: US 6,373,226 B1
(45) Date of Patent: Apr. 16, 2002

(54) METHOD OF CONTROLLING DISCHARGE OF A PLURALITY OF RECHARGEABLE BATTERIES, AND BATTERY ASSEMBLY

(75) Inventors: Tsukasa Itou; Satoshi Narukawa, both of Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/626,123

(22) Filed: Jul. 26, 2000

(30) Foreign Application Priority Data

Jul. 30, 1999 (JP) .......................................... 11-216178

(51) Int. Cl.$^7$ ................................................. H02J 7/00
(52) U.S. Cl. ..................................................... 320/132
(58) Field of Search .............................. 307/18, 23, 25, 307/29, 38, 39, 43, 48; 320/132, 134, 136

(56) References Cited

U.S. PATENT DOCUMENTS 5,498,950 A    3/1996  Ouwerkerk ................. 320/119
5,880,575 A  * 3/1999  Itou et al. .................... 320/122
5,959,368 A  * 9/1999  Kubo et al. .................... 307/18
5,998,969 A  * 12/1999 Tsuji et al. .................. 320/132
6,060,864 A  * 5/2000  Ito et al. ...................... 320/136
6,075,345 A  * 6/2000  Lee ............................. 320/138
6,163,086 A  * 12/2000 Choo ........................... 307/43

FOREIGN PATENT DOCUMENTS

GB    2 310 327 A    8/1997
GB    2 337 166 A    11/1999

* cited by examiner

*Primary Examiner*—Peter S. Wong
*Assistant Examiner*—Pia Tibbits
(74) *Attorney, Agent, or Firm*—Wenderoth, Lind & Ponack, L.L.P.

(57) ABSTRACT

The discharge method discharges a plurality of serially connected rechargeable batteries, wherein the remaining charge in each discharging rechargeable battery is detected, and a battery with the lowest remaining charge is designated a low charge rechargeable battery. The plurality of serially connected rechargeable batteries are discharged while supplying battery voltage stepped down from the output voltage of the serially connected rechargeable batteries to the low capacity rechargeable battery.

21 Claims, 1 Drawing Sheet

METHOD OF CONTROLLING DISCHARGE OF A PLURALITY OF RECHARGEABLE BATTERIES, AND BATTERY ASSEMBLY

This application is based on application No. 11-216178 filed in Japan on Jul. 30,1999, the content of which incorporated hereinto by reference.

BACKGROUND OF THE INVENTION

The present invention relates to a discharge method which can efficiently discharge a plurality of rechargeable batteries, and to a battery assembly containing a discharge control circuit which discharges batteries according to this discharge method.

A battery assembly can output high voltages by connecting a plurality of rechargeable batteries in series. When this battery assembly supplies power to a load, the same current flows through all the rechargeable batteries. For this reason, if the capacities of all the batteries are not equal, i.e. unbalanced, the remaining battery capacity of a low capacity battery will become smaller than that of a high capacity battery. As a result, when the high capacity battery becomes completely discharged, the low capacity battery has already over-discharged. This problem can be overcome by stopping battery assembly discharge when the low capacity battery becomes completely discharged. However, when battery assembly discharge is stopped in this fashion, the total power output from the entire battery assembly is limited by the battery with the lowest battery capacity.

This problem would not occur if the battery assembly could be charged and discharged in a manner that created no battery capacity imbalance among any of the rechargeable batteries. However, connecting a plurality of rechargeable batteries in series and keeping all battery capacities equal at all times is, for practical purposes, utterly impossible. As charging and discharging is repeated, the battery capacities of a plurality of series connected rechargeable batteries have the tendency to become more unbalanced.

The imbalance between individual batteries of a battery assembly becomes more of a problem as the number of series connected batteries increases. For example, in a battery assembly with 100 rechargeable batteries connected in a series, keeping all rechargeable batteries in the same charge capacity state while charging and discharging repeatedly, is extremely difficult. For such a battery assembly, electrical performance of the system is significantly degraded if the capacity of even one battery is low. This is because the power which can be output by the battery assembly is relatively low when discharging is stopped to prevent over-discharge of the low capacity battery as described above. On the other hand, if discharging is continued to increase battery assembly output until the low capacity battery is over-charged, the efficiency of that battery rapidly deteriorates and the performance of the battery assembly as a system is degraded.

As a solution to this problem, a battery assembly provided with an auxiliary battery, separate from the series connected batteries, was developed. In this battery assembly, the remaining battery capacity of each battery is measured during discharge, and power is supplied from the auxiliary battery to the battery with the lowest remaining battery capacity. Since the battery with the lowest remaining battery capacity is supplied with power from the auxiliary battery, over-discharge is prevented. Therefore, total battery assembly output is increased while preventing over-discharge of the low capacity battery.

Although a battery assembly provided with an auxiliary battery can prevent over-discharge of the low capacity battery, it is necessary to include an additional auxiliary battery which is not used at all times. Consequently, as the size of the battery assembly increases, manufacturing cost increases, and since the auxiliary battery is not used at all times, the battery assembly has the drawback that the auxiliary battery cannot be used sufficiently. This battery assembly has the further drawback that over-discharge of the low capacity battery cannot be prevented if auxiliary battery capacity becomes low. The lifetime of the auxiliary battery may not always be greater than the lifetimes of all the batteries comprising the battery assembly.

Further, selection of the battery capacity for the auxiliary battery is extremely difficult. The purpose of the auxiliary battery is to compensate for battery capacity imbalance between a plurality of rechargeable batteries and prevent over-discharge of the low capacity battery. As battery capacity imbalance increases, a higher capacity auxiliary battery is required. However, the imbalance between individual batteries is definitely not fixed and varies widely depending upon the battery assembly. If auxiliary capacity is made large to reliably compensate for battery capacity imbalance, over-discharge of the low capacity battery can effectively be prevented, but auxiliary battery utilization efficiency decreases. In contrast, if auxiliary battery capacity is made small, the auxiliary battery cannot reliably prevent over-discharge of the low capacity battery.

The present invention was developed to eliminate these types of drawbacks associated with prior at battery assemblies. Thus, a primary object of the present invention is to provide a method of discharging a plurality of rechargeable batteries and a battery assembly which discharges according to that method wherein over-discharge of the low capacity battery can be prevented and the total output of the battery assembly can be increased without using an auxiliary battery.

The above and further objects and features of the invention will more fully be apparent from the following detailed description with accompanying drawings.

SUMMARY OF THE INVENTION

The discharge method of the present invention is a method of discharging a plurality of rechargeable batteries connected in a series, wherein the remaining battery capacity of each discharging rechargeable battery is measured, and discharge proceeds while battery voltage stepped down from the output voltage of a plurality of series connected rechargeable batteries is supplied to a rechargeable battery determined to have low remaining charge.

In this discharge method, remaining battery charge can be determined by measuring the voltage of each rechargeable battery. The remaining battery charge of a rechargeable battery with reduced battery voltage is judged as low, and thus the low charge rechargeable battery can be determined.

In the discharge method of the present invention, output voltage from the series connected rechargeable batteries is converted to a battery level voltage by a DC/DC converter, and this voltage can be supplied to the low capacity rechargeable battery. The DC/DC converter reduces voltage from a level capable of charging the low capacity rechargeable battery to a level which reduces low capacity rechargeable battery discharge current. DC/DC converter output voltage is supplied to the low capacity rechargeable battery.

DC/DC converter output voltage can be changed depending on the remaining battery capacity of the low capacity rechargeable battery.

Further, the battery assembly of the present invention contains a plurality of series connected rechargeable batteries and a discharge control circuit to control the discharge state of the rechargeable batteries. This battery assembly discharges a plurality of series connected rechargeable batteries to supply power to a load. In addition, this battery assembly has a discharge control circuit provided with a remaining battery capacity detection circuit to measure the remaining battery capacity of each rechargeable battery and determine the low capacity rechargeable battery, a DC/DC converter to step down the output voltage of a plurality of series connected rechargeable batteries to a battery level voltage, and switching circuitry to supply DC/DC converter output to the low capacity rechargeable battery. This battery assembly discharges while supplying output voltage, from a plurality of rechargeable batteries converted to battery level voltage by the DC/DC converter, to a rechargeable battery determined to have low remaining battery capacity by the remaining battery capacity detection circuit.

In this battery assembly, DC/DC converter output voltage can be changed depending on the remaining battery capacity of the low capacity rechargeable battery.

The above discharge method, and battery assembly utilizing that method for discharging rechargeable batteries have the outstanding feature that over-discharge of each rechargeable battery can be prevented while total output can be increased, even though an auxiliary battery is not used. Thus is because a rechargeable battery with low battery charge, which has the possibility of being over-discharged, is determined to be the low charge rechargeable battery, and power is supplied to this low charge rechargeable battery from the other batteries.

A discharging method and battery assembly with many rechargeable batteries connected in series, which can discharge without over-discharging any individual battery, can not only increase battery assembly total power output, but also can extend the life of the rechargeable batteries. This discharge method and battery assembly have the exceptional characteristic that each rechargeable battery can be discharged under ideal, balanced conditions. This characteristic is extremely important for a battery assembly, such as an automobile battery assembly, which has a large number of serially connected batteries. This is because the probability that one rechargeable battery will degrade increases in proportion to the number of batteries in a battery assembly with many serially connected rechargeable batteries, and if a battery degrades, the entire battery assembly becomes unuseable. Further, since the overall cost of a battery assembly with many serially connected rechargeable batteries is extremely high, long usable lifetime is important. Nevertheless, if any rechargeable battery in this type of battery assembly degrades and become unusable, the many other rechargeable batteries, which are in usable condition, become unusable. Therefore, in a battery assembly with many serially connected rechargeable batteries, having ideal discharge conditions for each rechargeable battery is of utmost importance.

Moreover, the discharge method and battery assembly described above do not prevent over-discharge of a degraded rechargeable battery via an auxiliary battery. Over-discharge of a degraded rechargeable battery is prevented via the other non-degraded rechargeable batteries. For this reason, there is no need to provide an auxiliary battery. Consequently, there is no need to control auxiliary battery charge and discharge, and the feature that all rechargeable batteries can be discharged under ideal, balanced conditions is realized.

DETAILED DESCRIPTION OF THE INVENTION

Figure 1:
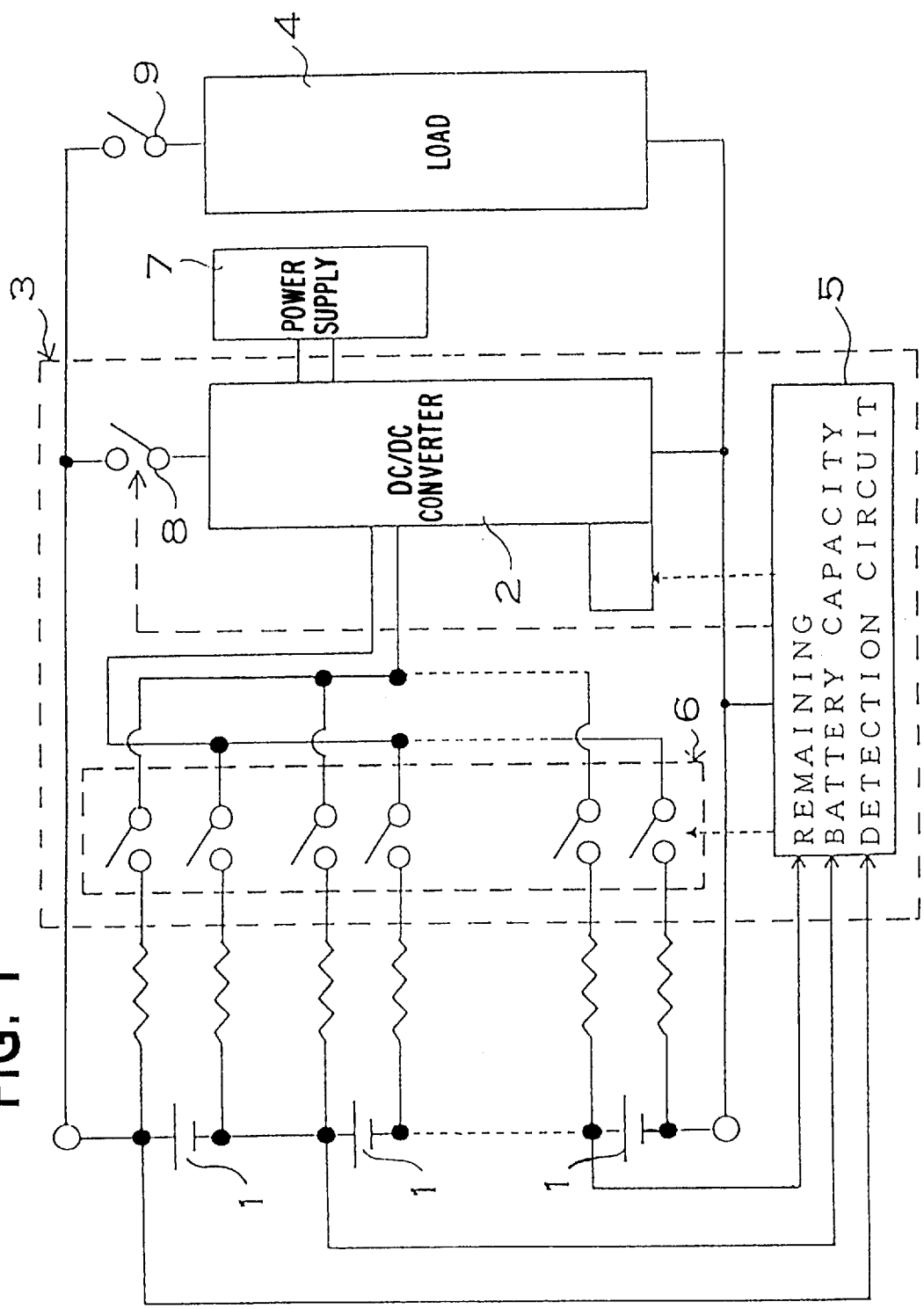
FIG. 1 is a block diagram of the battery assembly used in the discharge method of the present invention.

The battery assembly shown in FIG. 1 contains a plurality of series connected rechargeable batteries 1 and a discharge control circuit 3 to control the state of discharge of the rechargeable batteries 1. The battery assembly discharges the plurality of series connected rechargeable batteries 1 to supply power to a load 4. The rechargeable batteries 1 are lithium ion rechargeable batteries. However, rechargeable batteries 1 may also be nickel hydrogen batteries, nickel cadmium batteries, or some other type of rechargeable batteries. The number of rechargeable batteries in the battery assembly varies depending on the application. The battery assembly may be used to drive a motor to power an automobile, or it may be used as the power source for a personal computer. A battery assembly for driving an automobile motor may have 100 to 300 rechargeable batteries connected in series.

The discharge control circuit 3 is provided with a remaining battery capacity detection circuit 5 to measure the remaining battery capacity of each rechargeable battery 1 and determine the low capacity battery, a DC/DC converter 2 to reduce the output voltage of the plurality of series connected rechargeable batteries 1 to a battery level voltage, and switching circuitry 6 to supply DC/DC converter 2 output to the low capacity rechargeable battery.

The remaining battery capacity detection circuit 5 measures remaining battery capacity by measuring the voltage of each rechargeable battery 1. The remaining battery capacity detection circuit 5 sequentially measures the voltage of each rechargeable battery 1, judges batteries with reduced voltage to have low remaining battery capacity, and determines the low capacity battery. A remaining battery capacity detection circuit 5 which determines remaining battery capacity from battery voltage can be a simple detection circuit. However, the remaining battery capacity detection circuit 5 can also integrate charging current and discharge current, in addition to measuring battery voltage, to determine remaining battery capacity.

The remaining battery capacity detection circuit 5 determines the rechargeable battery 1 with the lowest remaining battery capacity or with remaining battery capacity below a prescribed level as the low capacity battery. A remaining battery capacity detection circuit 5 which determines remaining battery capacity from battery voltage determines the rechargeable battery 1 with the most reduced voltage or with voltage which has dropped below a prescribed level as the low capacity battery. The remaining battery capacity detection circuit 5 is connected to each rechargeable battery 1, and is sequentially switched to read the voltage of each rechargeable battery 1 and determine remaining battery capacity.

The remaining battery capacity detection circuit 5 controls the switching circuitry 6 to supply battery voltage output from the DC/DC converter 2 to the low capacity battery. The remaining battery capacity detection circuit 5 controls the switching circuitry 6 to connect the low capacity rechargeable battery to the output side of the DC/DC converter 2 and disconnect all other rechargeable batteries 1 from the output side of the DC/DC converter 2.

The DC/DC converter 2 converts the output voltage of the plurality of series connected rechargeable batteries 1 to alternating current (AC) via switching, reduces the AC voltage via a transformer, and converts the AC to direct current (DC) for output. DC/DC converter 2 output voltage can be a constant battery level voltage, or it can vary according to the remaining battery capacity of the low capacity battery. DC/DC converter 2 output voltage is set to a voltage which can charge the low capacity battery while in the discharge mode, or is set to a voltage which cannot charge the low capacity battery but can reduce its discharge current or make it zero. In a DC/DC converter 2 which varies its output voltage according to the remaining battery capacity of the low capacity battery, output voltage is increased as remaining battery capacity of the low capacity battery decreases, and is reduced as remaining battery capacity increases.

In a battery assembly with DC/DC converter 2 output voltage capable of charging the low capacity battery, the remaining battery capacity of the low capacity battery can be made equal to that of the other rechargeable batteries 1 in a short period because the other rechargeable batteries 1 are discharged while the low capacity battery is charged. In a battery assembly with DC/DC converter 2 output voltage not capable of charging the low capacity battery but capable of reducing its discharge current or making the discharge current zero, all rechargeable batteries 1 can be discharged while preventing over-discharge of the low capacity battery. In particular, for a battery assembly with DC/DC converter 2 output voltage set to make the low capacity battery discharge current zero, the low capacity battery can be a completely discharged rechargeable battery. By supplying battery level voltage from the DC/DC converter 2 to this low capacity battery, the battery assembly can be discharged while preventing over-discharge of the low capacity battery.

In a battery assembly with many rechargeable batteries connected in series, a plurality of rechargeable batteries 1 can be designated as low capacity batteries prior to complete discharge, and battery voltage from the DC/DC converter 2 can also be supplied to these batteries. The output voltage of the DC/DC converter 2 of this battery assembly is set to a voltage greater than that which reduces the discharge current of the low capacity batteries to zero. The output voltage of the DC/DC converter 2 for this battery assembly is set between a voltage which charges the low capacity batteries and a voltage which reduces their discharge current. Preferably, the output voltage of the DC/DC converter 2 for this battery assembly is set to a voltage which can charge the low capacity batteries. This is because power supplied from the DC/DC converter 2 to a rechargeable battery 1 designated as the low capacity battery can quickly bring the remaining battery capacity of that low capacity battery into balance with the other rechargeable batteries 1. In this battery assembly, when the remaining battery capacity of any one of the rechargeable batteries 1 becomes low and that battery is designated the low capacity battery, battery voltage is supplied to that battery to bring its remaining battery capacity into balance with the other rechargeable batteries 1. Next, when the remaining battery capacity of a different rechargeable battery 1 becomes low and that battery is designated the low capacity battery, battery voltage is then supplied to that battery to bring its remaining battery capacity into balance with the other rechargeable batteries 1. Consequently, prior to compete discharge of the battery assembly, a plurality of rechargeable batteries 1 are determined to be the low capacity battery and are supplied with power from the DC/DC converter 2 to balance remaining battery capacities during discharge.

The switching circuitry 6 connects the positive and negative terminals of each rechargeable battery 1 with the positive and negative output terminals of the DC/DC converter 2 to independently connect each rechargeable battery 1 to the output side of the DC/DC converter 2. In this switching circuitry 6, switching devices are connected between the DC/DC converter 2 and the rechargeable batteries 1. The switching devices are field effect transistors (FETs), but they may also be (bipolar) transistors. Further, in the switching circuitry 6 of FIG. 1, protection resistors are connected in series with the switching devices.

Switching circuitry 6 switching devices connected to the positive and negative terminals of a rechargeable battery 1 form a pair, and each pair is controlled on and off by the remaining battery capacity detection circuit 5. When the remaining battery capacity detection circuit 5 switches any one pair of switching devices on, it turns all other switching devices off. This is to supply battery voltage from the DC/DC converter 2 to a single low capacity battery.

The battery assembly shown in FIG. 1 is charged and discharged in the following manner.

(1) The battery assembly is charged to full capacity. Battery assembly series connected rechargeable batteries 1 are individually charged to full capacity in sequence, or they are charged to full capacity while connected together in series. The method of fully charging individual rechargeable batteries 1 in sequence has the feature that each battery can be fully charged without over-charging. A power supply 7 is connected to the DC/DC converter 2 of FIG. 1. Charging voltage from the power supply 7 is supplied to each rechargeable battery 1 to fully charge each battery in sequence, or is supplied to the series connected rechargeable batteries 1 to fully charge all batteries together. For an automobile battery assembly, the power supply 7 is a generator/alternator. In a battery assembly for household electronics, such as a personal computer (PC), the power supply 7 is a device such as an AC adapter.

A battery assembly which sequentially charges each individual rechargeable battery 1 can utilize the switching devices of the switching circuitry 6 for charging. In a battery assembly which charges all series connected rechargeable batteries 1 together, the switching circuitry 6 switching devices are turned off, and rechargeable batteries 1 are charged by power from the DC/DC converter 2 supplied from the power supply 7. At this time, for the battery assembly shown in FIG. 1, the charging switch 8, which connects the DC/DC converter 2 in series with the rechargeable batteries 1, is turned on.

(2) When the battery assembly is discharged, the discharge switch 9, connected between the battery assembly and the load 4, is switched on. At this time, all of the rechargeable batteries 1 contained in the battery assembly supply power to the load 4 in a series connected configuration. The voltage of the battery assembly is equal to the number of rechargeable batteries 1 times the battery voltage.

(3) When the rechargeable batteries 1 are discharged, the remaining battery capacity detection circuit 5 of the discharge control circuit 3 measures the voltage of each rechargeable battery 1 to determine remaining battery capacity. The rechargeable battery 1 with the lowest remaining battery capacity or with capacity below a prescribed value is designated as the low capacity battery, and switching devices connected to the positive and negative terminals of the low capacity battery are switched on while all other switching devices remain in the off state.

Immediately after discharge is started, the remaining battery capacity detection circuit 5 determines rechargeable battery 1 remaining battery capacity and designates the rechargeable battery 1 with either the lowest remaining battery capacity or with remaining battery capacity below a set capacity as the low capacity battery.

In a discharge method which determines the low capacity battery immediately after discharge is started and supplies battery voltage from the DC/DC converter 2 to that low capacity battery, DC/DC converter 2 output can be reduced and over-discharge of the low capacity battery can be prevented. This is because the DC/DC converter 2 supplies power to the low capacity battery over a long time period.

In a method which determines a low capacity battery with remaining battery capacity lower than a prescribed capacity and supplies battery voltage from the DC/DC converter 2 to that low capacity battery, it is not necessary to supply battery voltage from the DC/DC converter 2 immediately after starting discharge of the fully charged battery assembly. During battery assembly discharge, when the remaining battery capacity of any rechargeable battery 1 drops below the prescribed capacity, and it is judged that the low capacity battery will over-discharge if this condition persists, this low capacity battery is either charged or its discharge current is reduced by supplying battery voltage from the DC/DC converter 2.

In either discharge method, battery voltage is supplied from the DC/DC converter 2 to the rechargeable battery 1 designated the low capacity battery. When the remaining battery capacity of the designated low capacity battery becomes greater than that of the other rechargeable batteries 1 or greater than a prescribed battery capacity, the switching devices connected to that low capacity battery are switched off and power supply from the DC/DC converter 2 is stopped.

(4) Subsequently, the remaining battery capacity of each rechargeable battery 1 is measured and when the battery with the lowest remaining battery capacity or with capacity below the prescribed capacity is determined, step (3) is repeated, the low capacity battery is connected to the DC/DC converter 2, and battery assembly discharge is performed while preventing over-discharge of the low capacity battery.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within the meets and bounds of the claims, or equivalence of such meets and bounds thereof are therefore intended to be embraced by the claims.

What is claimed is:

1. A method of discharging a plurality of serially connected rechargeable batteries comprising:
    discharging the plurality of serially connected rechargeable batteries into a load;
    measuring remaining charge in each rechargeable battery being discharged;
    detecting which of the rechargeable batteries has a lowest charge;
    reducing a battery voltage supplied from the plurality of serially connected rechargeable batteries; and
    supplying a reduced voltage to the lowest charged rechargeable battery.

2. A method of discharging as recited in claim 1, wherein the voltage of each rechargeable battery is measured to determine the remaining charge for each battery, respectively.

3. A method of discharging as recited in claim 1, wherein the serially connected rechargeable batteries are individually charged to full capacity in sequence.

4. A method of discharging as recited in claim 1, further comprising:
    converting the output voltage from the plurality of serially connected rechargeable batteries into to a battery charging voltage via a DC/DC converter.

5. A method of discharging as recited in claim 4, wherein the DC/DC converter provides an output voltage that is varied depending on the remaining battery charge of the lowest charged rechargeable battery.

6. A method of discharging as recited in claim 4, wherein the DC/DC converter provides an output voltage that is a fixed voltage.

7. A method of discharging as recited in claim 4, wherein DC/DC converter provides an output voltage that is capable of charging the lowest charged rechargeable battery.

8. A method of discharging as recited in claim 4, wherein DC/DC converter provides an output voltage that is capable of reducing a discharge current of the lowest charged rechargeable battery without recharging the lowest charged rechargeable battery.

9. A method of discharging as recited in claim 4, wherein DC/DC converter provides an output voltage that is incapable of charging the lowest charged rechargeable battery, but is capable of eliminating discharge current of the lowest charged rechargeable battery.

10. A method of discharging as recited in claim 4, further comprising:
    raising the DC/DC converter output voltage when the remaining charge of the lowest charged rechargeable battery decreases; and
    lowering the DC/DC converter output voltage when remaining charge of the lowest charged rechargeable battery increases.

11. A method of discharging and charging a plurality of serially connected rechargeable batteries comprising:
    discharging an output voltage from the plurality of serially connected rechargeable batteries into a load;
    measuring remaining charge in each rechargeable battery being discharged;
    converting the output voltage from the plurality of serially connected rechargeable batteries into a battery charging voltage via a DC/DC converter;
    determining which of the plurality of rechargeable batteries have a charge that is below a predetermined amount; and
    charging the plurality of rechargeable batteries that have a charge that is below the predetermined amount with a DC/DC converter output.

12. A battery assembly which supplies power to a load, said battery assembly comprising:
    a plurality of serially connected rechargeable batteries, each rechargeable battery having a positive and negative terminal, respectively;
    a discharge control circuit to control the state of rechargeable battery discharge, said discharge control circuit comprising;
        a remaining battery capacity detection circuit to measure the remaining charge of each rechargeable battery and determine which rechargeable battery of the plurality of serially connected rechargeable batteries has the lowest charge,
        a DC/DC converter to convert an output voltage from the plurality of serially connected rechargeable batteries to a reduced battery voltage, the DC/DC converter having positive and negative output terminals, and switching circuitry to supply the reduced battery voltage to the rechargeable battery of the plurality of serially connected rechargeable batteries that has the lowest charge;

wherein the discharge control circuit is operable to discharge the plurality of serially connected rechargeable batteries, while output from the plurality of serially connected rechargeable batteries is converted to a battery voltage by the DC/DC converter; and wherein the discharge control circuit is operable to supply the reduced battery voltage to the rechargeable battery determined to have the lowest charge by the remaining battery capacity detection circuit.

13. A battery assembly as recited in claim 12, wherein the DC/DC converter is operable to output voltage depending on the remaining charge of the rechargeable battery of the plurality of serially connected rechargeable batteries that has the lowest charge.

14. A battery assembly as recited in claim 12, wherein DC/DC converter output voltage is a fixed voltage.

15. A battery assembly as recited in claim 12, wherein DC/DC converter is operable to output a voltage that is capable of charging the rechargeable battery of the plurality of serially connected rechargeable batteries that has the lowest charge.

16. A battery assembly as recited in claim 12,
wherein DC/DC converter is operable to output a voltage that is incapable of charging the rechargeable battery of the plurality of serially connected rechargeable batteries that has the lowest charge, and
wherein DC/DC converter is operable to output a voltage that is capable of reducing the discharge current of the rechargeable battery of the plurality of serially connected rechargeable batteries that has the lowest charge.

17. A battery assembly as recited in claim 12,
wherein the DC/DC converter is operable to output a voltage that is incapable of charging the rechargeable battery of the plurality of serially connected rechargeable batteries that has the lowest charge, and
wherein the DC/DC converter is operable to output a voltage that is capable of making the discharge current of rechargeable battery of the plurality of serially connected rechargeable batteries that has the lowest charge equal to zero.

18. A battery assembly as recited in claim 12,
wherein the DC/DC converter is operable to output a voltage that increases when the charge of the rechargeable battery of the plurality of serially connected rechargeable batteries that has the lowest charge decreases, and wherein the DC/DC converter is operable to output a voltage that decreases when the charge of the rechargeable battery of the plurality of serially connected rechargeable batteries that has the lowest charge increases.

19. A battery assembly as recited in claim 12, wherein switching circuitry further comprises switching devices, the switching devices are operable to independently connect positive and negative terminals of each rechargeable battery to positive and negative output terminals of the DC/DC converter.

20. A battery assembly as recited in claim 19, wherein the switching circuitry further comprises protection resistors, the protection resistors being connected in series with the switching devices.

21. A battery assembly which supplies power to a load, said battery assembly comprising:
a plurality of serially connected rechargeable batteries, each rechargeable battery having a positive and negative terminal, respectively;
discharge and charge control circuit to control the state of rechargeable battery discharge, said discharge control circuit comprising;
a remaining battery capacity detection circuit to measure the remaining charge of each rechargeable battery and determine which rechargeable battery of the plurality of serially connected rechargeable batteries has the lowest charge,
a DC/DC converter to convert an output voltage from the plurality of serially connected rechargeable batteries to a reduced battery voltage, the DC/DC converter having positive and negative output terminals,
switching circuitry to supply DC/DC converter output to the rechargeable battery of the plurality of serially connected rechargeable batteries that has the lowest charge, and
a charging circuit operable to sequentially charge individual serially connected rechargeable batteries to full capacity, respectively;
wherein the discharge control circuit is operable to discharge the plurality of serially connected rechargeable batteries, while output from the plurality of serially connected rechargeable batteries is converted to a battery voltage by the DC/DC converter; and
wherein the discharge control circuit is operable to supply the reduced battery voltage to the rechargeable battery determined to have the lowest charge by the remaining battery capacity detection circuit.

* * * * *